(12) United States Patent
Imoto et al.

(10) Patent No.: US 9,317,493 B2
(45) Date of Patent: Apr. 19, 2016

(54) HANDWRITTEN DOCUMENT PROCESSING APPARATUS AND METHOD

(71) Applicant: KABUSHIKI KAISHA TOSHIBA, Minato-ku, Tokyo (JP)

(72) Inventors: Kazunori Imoto, Kawasaki Kanagawa (JP); Toshiaki Nakasu, Tokyo (JP); Tomoyuki Shibata, Kawasaki Kanagawa (JP); Yojiro Tonouchi, Inagi Tokyo (JP); Shihomi Takahashi, Yokohama Kanagawa (JP); Yasunobu Yamauchi, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/616,516

(22) Filed: Feb. 6, 2015

(65) Prior Publication Data

US 2015/0154172 A1     Jun. 4, 2015

Related U.S. Application Data

(63) Continuation of application No. PCT/JP2013/072486, filed on Aug. 16, 2013.

(30) Foreign Application Priority Data

Aug. 17, 2012  (JP) ................. 2012-180958

(51) Int. Cl.
*G06K 9/00* (2006.01)
*G06F 17/24* (2006.01)
*G06K 9/32* (2006.01)

(52) U.S. Cl.
CPC .......... *G06F 17/245* (2013.01); *G06K 9/00416* (2013.01); *G06K 9/00456* (2013.01); *G06K 9/00463* (2013.01); *G06K 9/3233* (2013.01); *G06K 2209/01* (2013.01)

(58) Field of Classification Search
None
See application file for complete search history.

(56) References Cited

U.S. PATENT DOCUMENTS

| 2006/0061776 | A1  | 3/2006 | Chen et al. |
| 2007/0140565 | A1* | 6/2007 | Lin .................... G06K 9/00416 382/203 |
| 2010/0174732 | A1* | 7/2010 | Levy .................... G06F 17/211 707/768 |

FOREIGN PATENT DOCUMENTS

| EP | 1363230 | 11/2003 |
| JP | 08-050650 | 2/1996 |

OTHER PUBLICATIONS

International Search Report for application No. PCT/JP2013/072486, mailed on Feb. 27, 2014.
Background Art Information prepared by Toshiba, Jan. 8, 2013—1 page.

* cited by examiner

*Primary Examiner* — Stephen R Koziol
*Assistant Examiner* — Raphael Schwartz
(74) *Attorney, Agent, or Firm* — Knobbe, Martens, Olson & Bear, LLP (57) ABSTRACT

According to one embodiment, a handwritten document processing apparatus includes an inputter, classifier, divider, and determiner. The inputter inputs stroke data. The classifier classifies the stroke data into data of a plurality of ruled lines and stroke data other than ruled lines. The divider divides a region including the plurality of ruled lines into first regions each corresponding to a cell bounded by four ruled lines and second regions each including at most three ruled lines. The determiner determines whether a ruled line in the second region is a first ruled line, to one end point of which a ruled line is not connected, or a second ruled line, to one end point of which a virtual circumscribed ruled line is connected.

13 Claims, 12 Drawing Sheets

HANDWRITTEN DOCUMENT PROCESSING APPARATUS AND METHOD

CROSS-REFERENCE TO RELATED APPLICATIONS

This application is a Continuation Application of PCT Application No. PCT/JP2013/072486, filed Aug. 16, 2013 and based upon and claimimg the benefit of priority from Japanese Patent Application No. 2012-180958, filed Aug. 17, 2012, the entire contents of all of which are incorporated herein by reference.

FIELD

Embodiments described herein relate generally to a handwritten document processing apparatus and method.

BACKGROUND

A technique for extracting table ruled lines, ruled lines of a form, the like, and shaping them for the purpose of clean copy in an application including a pen input interface is known.

DETAILED DESCRIPTION

In general, according to one embodiment, a handwritten document processing apparatus includes an inputter, classifier, divider, and determiner. The inputter inputs stroke data. The classifier classifies the stroke data into data of a plurality of ruled lines and stroke data other than ruled lines. The divider divides a region including the plurality of ruled lines into first regions each corresponding to a cell bounded by four ruled lines and second regions each including at most three ruled lines. The determiner determines whether a ruled line in the second region is a first ruled line, to one end point of which a ruled line is not connected, or a second ruled line, to one end point of which a virtual circumscribed ruled line is connected.

An embodiment will be described hereinafter with reference to the drawings.

A handwritten document processing apparatus according to this embodiment is applied to, for example, a notebook application including a pen input interface. This application allows the user to manually handwrite a table without using any graphic drawing tool in a free layout. In this case, the lengths of ruled lines may often be uneven or the ruled lines may often become non-straight, curved lines. Also, the user may often omit ruled lines of an outer frame (to be referred to as circumscribed ruled lines hereinafter) when he or she handwriting-inputs a table. This embodiment relates to improvement of a user interface required to cope with these situations, and can appropriately process handwritten ruled lines to shape a table.

Figure 1:
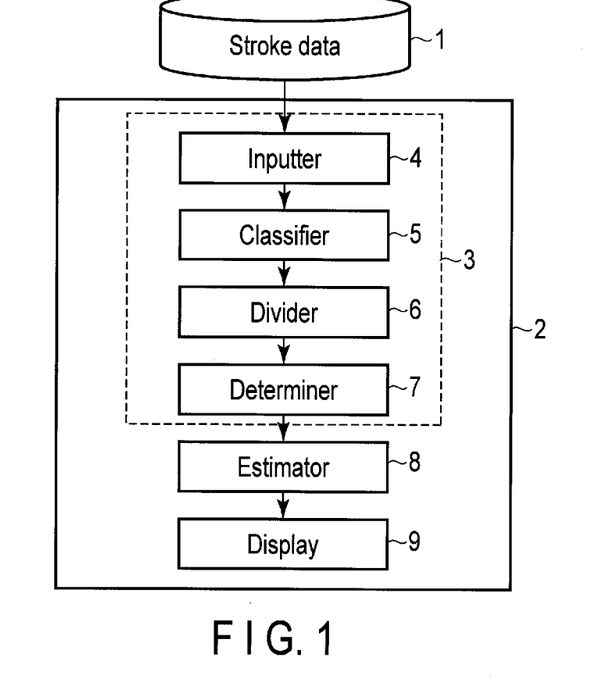
FIG. 1 is a block diagram of a handwritten document processing apparatus according to an embodiment.

FIG. 1 is a block diagram of the handwritten document processing apparatus according to the embodiment. A handwritten document processing apparatus 2 processes, for example, handwriting inputs using a pen input interface. A principal part 3 of the apparatus 2 includes an inputter used to input stroke data 1, a classifier 5 which classifies the stroke data 1 into ruled lines and other data, a divider 6 which divides a region including ruled lines into first and second regions, and a determiner 7 which applies determination processing to the ruled lines in the second region.

The apparatus 2 includes an estimator 8 which estimates, for example, circumscribed ruled lines, and a display 9 which displays a shaped table based on the estimation result of the estimator 8. This embodiment may be modified so that the estimator 8 is included in the principal part 3. Alternatively, this embodiment may also be modified so that the estimator 8 and display 9 are excluded from the apparatus 2, and the result of the determiner 7 is used as final output data.

Figure 2:
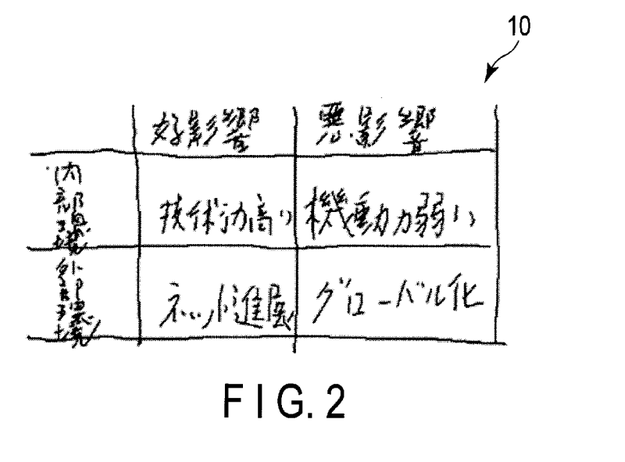
FIG. 2 shows a display example of stroke data.

The inputter 4 inputs stroke data 1 provided via, for example, the pen input interface. FIG. 2 shows a display example 10 of the stroke data 1. The stroke data 1 have coordinate time-series data classified for each stroke, and are expressed, for example, as follows:

Stroke 1: $(x(1, 1), y(1, 1)), (x(1, 2), y(1, 2)), \ldots, (x(1, N(1)), y(1, N(1)))$ Stroke 2: $(x(2, 1), y(2, 1)), (x(2, 2), y(2, 2)), \ldots, (x(2, N(2)), y(2, N(2)))$

. . .

where $N(i)$ is the number of points at the time of sampling of a stroke i. An example of the more detailed structure of the stroke data 1 (handwriting data) will be described later.

The classifier 5 classifies the stroke data 1 into a plurality of ruled line data and stroke data other than the ruled lines. Ruled lines of a table are characterized in that (1) a stroke length is relatively large, and (2) an aspect ratio decided by start and end points of a stroke is extremely large/small. Thus, the stroke data 1 can be classified into ruled lines and other data based on these criteria.

Figure 3:
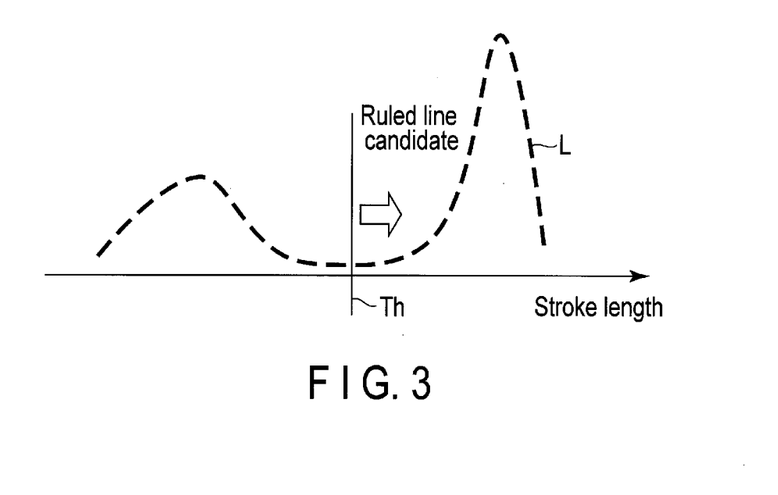
FIG. 3 is a graph showing a histogram of stroke data.
Figure 4:
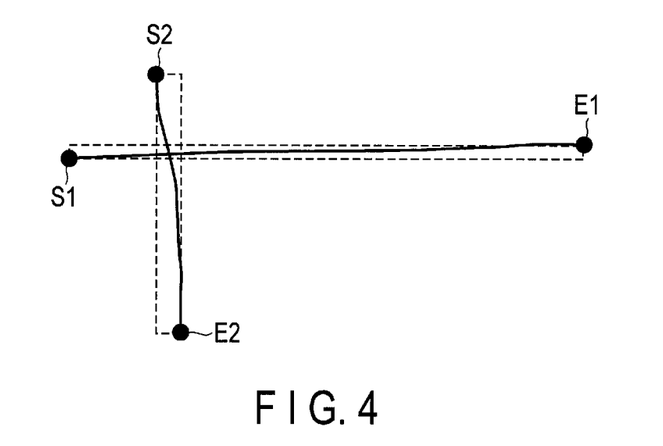
FIG. 4 is a view showing aspect ratios of strokes.

FIG. 3 shows a histogram of stroke lengths. In a histogram L in FIG. 3, a stroke having a stroke length, which exceeds a threshold Th, is a ruled line (or a ruled line candidate). This corresponds to the above condition (1). FIG. 4 shows aspect ratios decided by start and end points of strokes. Referring to FIG. 4, since a stroke having a start point S1 and end point E1 is extremely longer in the horizontal direction than in the vertical direction, it is classified into a ruled line. Also, since a stroke having a start point S2 and end point E2 is extremely longer in the vertical direction than in the horizontal direction, it is also classified into a ruled line. The example shown in FIG. 4 corresponds to the above condition (2).

Figure 5:
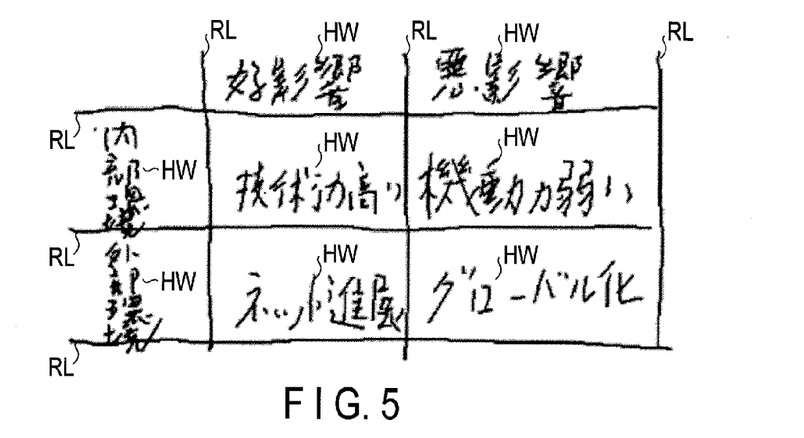
FIG. 5 is a view for explaining a processing result of a classifier.

FIG. 5 is a view for explaining the processing result of the classifier 5. Referring to FIG. 5, reference symbol RL denotes a plurality of ruled line data in the stroke data 1; and HW, stroke data other than ruled lines in the stroke data 1. Note that the stroke data HW correspond to handwritten character strings (in this example, "好影響", "悪影響", "内部環境", ... "グローバル化") input to cells of a handwritten table.

Figure 6A:
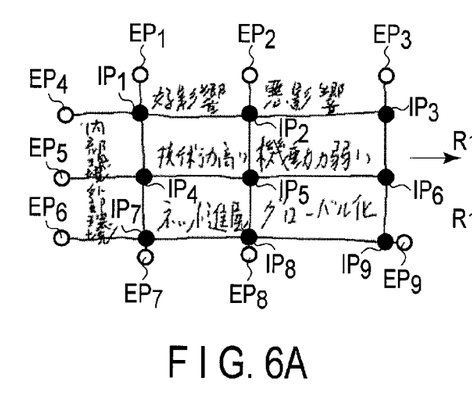
FIGS. 6A and 6B are views for explaining region divisions.
Figure 6B:
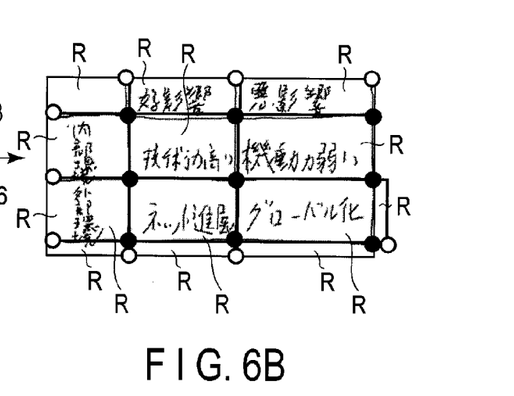
Figure 7:
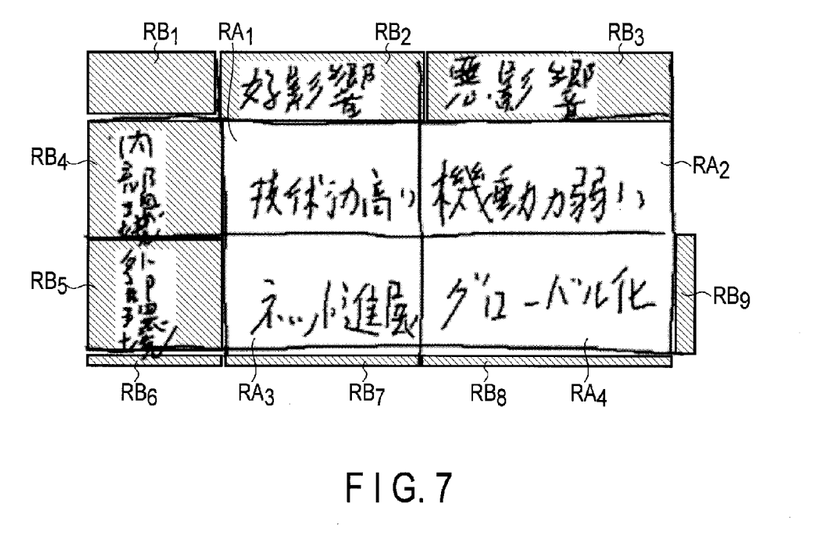
FIG. 7 is a view showing a region division result.

The divider 6 divides a region including a plurality of ruled lines, which are classified by the classifier 5, into a first region corresponding to a cell bounded by four ruled lines, and a second region including at most three ruled lines. In this case, attention is focused only on data classified into ruled lines in the stroke data 1. As shown in FIG. 6A, intersection points ($IP_1$ to $IP_9$) and end points ($EP_1$ to $EP_9$) of strokes are detected. Next, from the end points ($EP_1$ to $EP_9$), a plurality of end points, which are located at endmost positions of respective sides of rectangles, are selected to obtain a region including a plurality of ruled lines (that is, all the ruled lines) classified by the classifier 5. This inclusive region need not always be one rectangle, but it may be a combination of a plurality of rectangles, as shown in FIG. 6B. Next, the inclusive region is divided into a plurality of regions R based on the intersection points ($IP_1$ to $IP_9$) (FIG. 6B). These plurality of regions R include first regions $RA_1$ to $RA_4$ and second regions $RB_1$ to $RB_9$, as shown in FIG. 7.

For example, the first region $RA_1$ corresponds to a cell (including a handwritten character string "技術力高い") bounded by the four intersection points $IP_1$, $IP_2$, $IP_3$, and $IP_4$ shown in FIG. 6A. Likewise, the first region $RA_2$ corresponds to a cell (including a handwritten character string "機動力弱い") bounded by the four intersection points $IP_2$, $IP_3$, $IP_5$, and $IP_5$. These first regions $RA_1$ to $RA_4$ will be referred to as "cell regions" hereinafter.

By contrast, for example, the second region $RB_1$ includes the end point $EP_1$ (and $EP_4$), as shown in FIG. 6A. Also, the second region $RB_1$ is not bounded by four intersection points, and includes only the intersection point $IP_1$. Therefore, the second region $RB_1$ corresponds to a region in which some ruled lines of a cell corresponding to this region are missing, and which includes at most three ruled lines (two ruled lines in this example). These second regions $RB_1$ to $RB_9$ will be referred to as "small extension regions" hereinafter. Likewise, the second region $RB_2$ includes the end point $EP_1$ (and $EP_2$), as shown in FIG. 6A. Also, the second region $RB_2$ includes only the two intersection points $IP_1$ and $IP_2$, and is not bounded by four intersection points. Likewise, the second region $RB_9$ includes the end point $EP_9$, as shown in FIG. 6A. Also, the second region $RB_9$ includes only the two intersection points $IP_6$ and $IP_9$, and is not bounded by four intersection points.

The divider 6 may simply execute region division, so a set of regions each including at least one end point is determined as a small extension region, and a set of other regions is determined as a cell region" or "regions each including at least one end point are determined as extension regions, and other regions are determined as cell regions". Alternatively, the divider 6 may execute region division, so that "a set of regions each including four intersection points is determined as a cell region, and a set of other regions is determined as a small extension region" or "regions each including four intersection points are determined as cell regions, and other regions are determined as small extension regions".

The determiner 7 determines for each of the small extension regions ($RB_1$ to $RB_9$) whether a ruled line of a small extension region of interest is a first ruled line (to be referred to as "small extension ruled line" hereinafter), to one end point of which no ruled line is connected, or a second ruled line, to one end point of which a virtual circumscribed ruled line is connected. The small extension ruled line is a "small extension" protruding from an intersection point of ruled lines, and should be removed upon shaping a table in principle.

Embodiment A

In an embodiment A, the determiner 7 determines a ruled line, which falls below a first reference value based on a statistical amount calculated from stroke lengths of ruled lines that define a cell, as a small extension ruled line.

Figure 8:
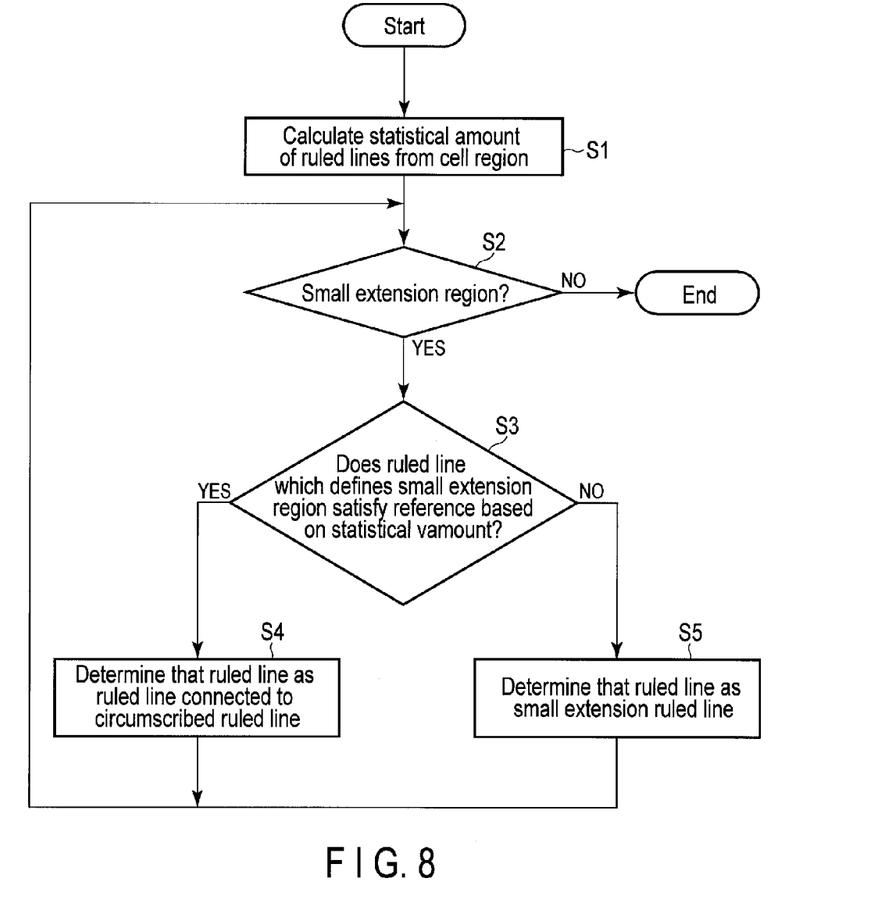
FIG. 8 is a flowchart of processing by a determiner.

FIG. 8 is a flowchart of processing by the determiner 7 of the embodiment A.

(Step S1)

Figure 9:
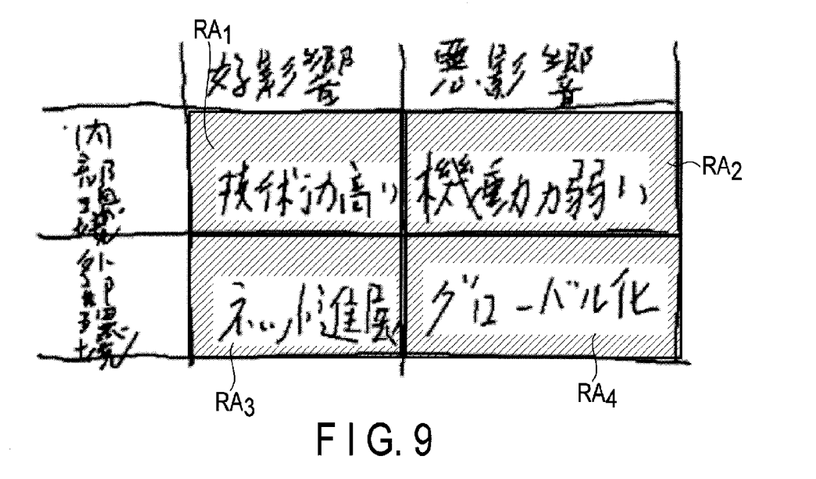
FIG. 9 is a view for explaining calculations of statistical amounts based on cell regions.

The determiner 7 calculates statistical amounts of ruled lines based on strokes of a plurality of ruled lines of cell regions ($RA_1$ to $RA_4$) shown in FIG. 9. Simply, an average of vertical stroke lengths and that of horizontal stroke lengths are respectively used as statistical amounts.

(Step S2)

The determiner 7 determines whether or not small extension regions to be processed still remain. If all the small extension regions are processed, the processing ends.

(Step S3)

The determiner 7 determines whether or not ruled lines which define a small extension region meet criteria based on the statistical amounts in step S1. Note that a value obtained by multiplying the average of the vertical stroke lengths by a predetermined coefficient (for example, 0.5) is used as a first reference value of a vertical stroke, and a value obtained by multiplying the average of the horizontal stroke lengths by the predetermined coefficient is used as a first reference value of a horizontal stroke.

(Step S4)

If a ruled line which defines the small extension region is a vertical stroke, and if a vertical stroke length of that ruled line is equal to or larger than the first reference value of the vertical stroke length, the determiner 7 determines that the ruled line is that which is connected to a virtual circumscribed ruled line. On the other hand, if a ruled line which defines the small extension region is a horizontal stroke, and if a horizontal stroke length of that ruled line is equal to or larger than the first reference value of the horizontal stroke length, the determiner 7 also determines that the ruled line is that which is connected to a virtual circumscribed ruled line. These ruled lines correspond to those which satisfy the references in the determination process of step S3.

(Step S5)

If a ruled line which defines the small extension region is a vertical stroke, and if a vertical stroke length of that ruled line falls below the first reference value of the vertical stroke length, the determiner 7 determines that the ruled line is a small extension ruled line. On the other hand, if a ruled line which defines the small extension region is a horizontal stroke, and if a horizontal stroke length of that ruled line falls below the first reference value of the horizontal stroke length, the determiner 7 also determines that the ruled line is a small extension ruled line. These ruled lines correspond to those which do not satisfy the references in the determination process of step S3.

Figure 10:
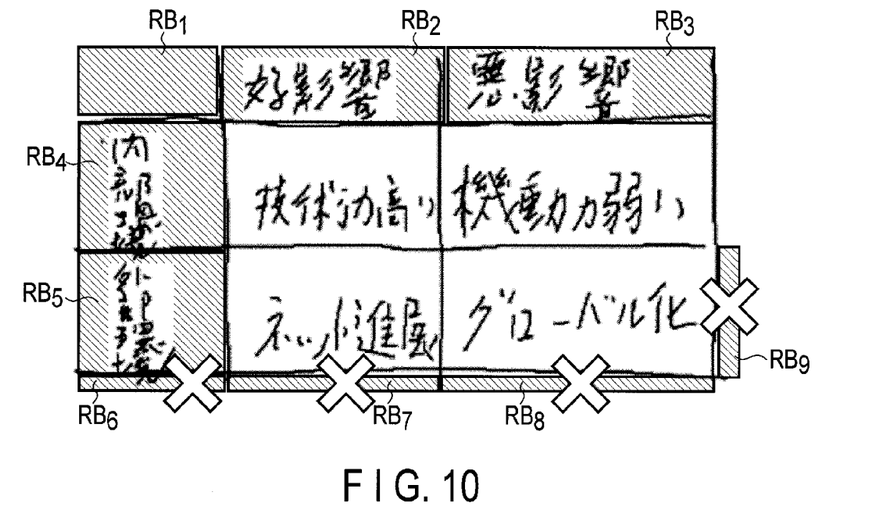
FIG. 10 is a view showing a processing result of the determiner.
Figure 11:
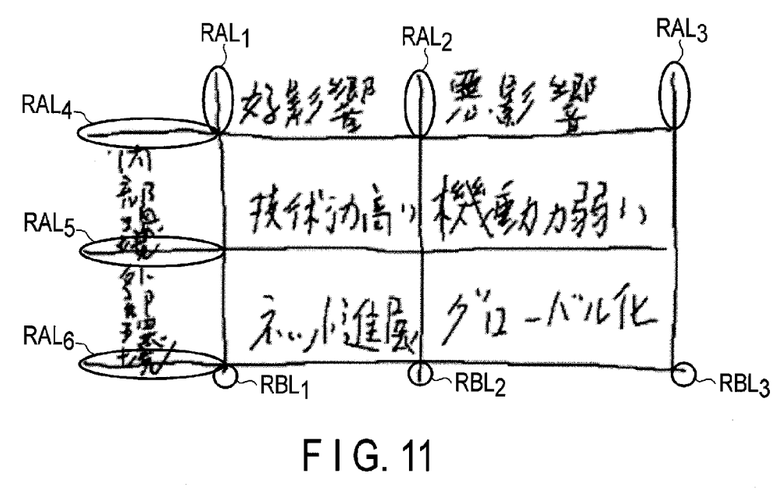
FIG. 11 is a view showing a processing result of the determiner.

FIGS. 10 and 11 are views showing the processing result of the determiner 7. As a result of the processing of the small extension regions ($RB_1$ to $RB_9$), the small extension regions $RB_6$, $RB_7$, $RB_8$, and $RB_9$ include small extension ruled lines, as indicated by "X" marks. FIG. 11 shows small extension ruled lines $RBL_1$ to $RBL_3$ and second ruled lines $RAL_1$ to $RAL_6$ to which virtual circumscribed ruled lines are connected. According to estimation processing to be described later, circumscribed ruled lines to be connected to these second ruled lines $RAL_1$ to $RAL_6$ can be estimated to compensate for a table.

Embodiment B

Figure 12:
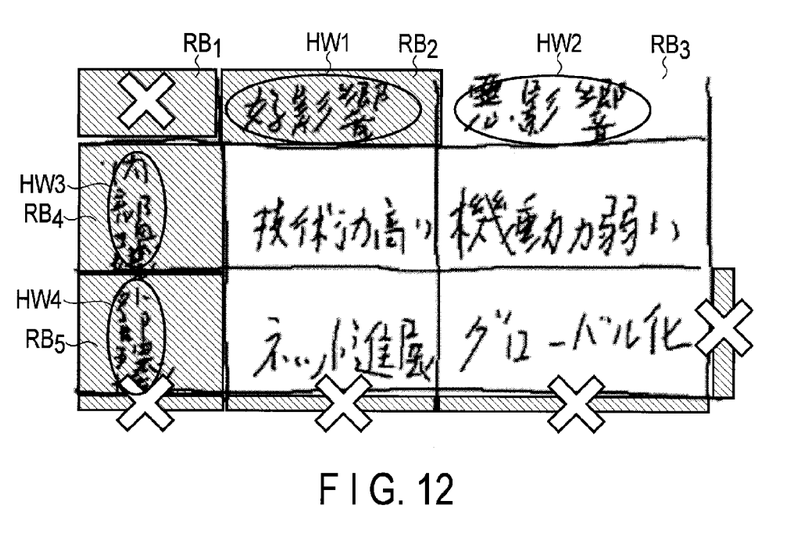
FIG. 12 is a view showing determination processing based on strokes other than ruled lines.

An embodiment B is different from the embodiment A in that determination independently of ruled line lengths is executed. In the embodiment B, if the number of strokes other than ruled lines in a small extension region is equal to or larger than a second reference value, the determiner 7 determines that ruled lines in that small extension region are second ruled lines to which virtual circumscribed ruled lines are connected. The strokes other than the ruled lines in the small extension region mean stroke groups HW1 (handwritten "好影響") to HW4 (handwritten "外部環境") which define handwritten characters and the like, as shown in FIG. 12. Assume that the second reference value (the number of strokes) is, for example, 4. In this examples, each of the stroke groups HW1 to HW4 apparently includes four strokes or more.

According to the embodiment B, ruled lines in small extension regions $RB_2$, $RB_3$, $RB_4$, and $RB_5$ are determined as second ruled lines. Ruled lines in remaining small extension regions are determined as small extension ruled lines. Therefore, the same result as in FIG. 11 can be obtained. The small extension regions $RB_2$, $RB_3$, $RB_4$, and $RB_5$ can be considered as cell regions, some ruled lines of which are missing.

Note that since the embodiment B executes determination based on the number of strokes other than ruled lines in place of the lengths of ruled lines, it can appropriately determine ruled lines whose lengths are short and to which virtual circumscribed ruled lines are to be connected.

In this case, the number of strokes other than ruled lines has been mainly described as the second reference. Alternatively, a total length of strokes other than ruled lines included in a small extension region may be used. For example, as shown in FIG. 12, a total of stroke lengths of each of the stroke groups HW1 to HW4 is apparently longer than a ruled line. A total of stroke lengths other than ruled lines included in a small extension region is calculated for each region, and the total length is compared with the second reference, thereby appropriately determining ruled lines to which virtual circumscribed ruled lines are to be connected.

Embodiment C

An embodiment C copes with a case in which no cell region exists. In this case, since there is no ruled line which defines a cell, a statistical amount in the embodiment A cannot be calculated. Also, when strokes other than ruled lines are not handwriting-input, since a region corresponding to a cell cannot be detected, the embodiment B cannot be applied.

Figure 13:
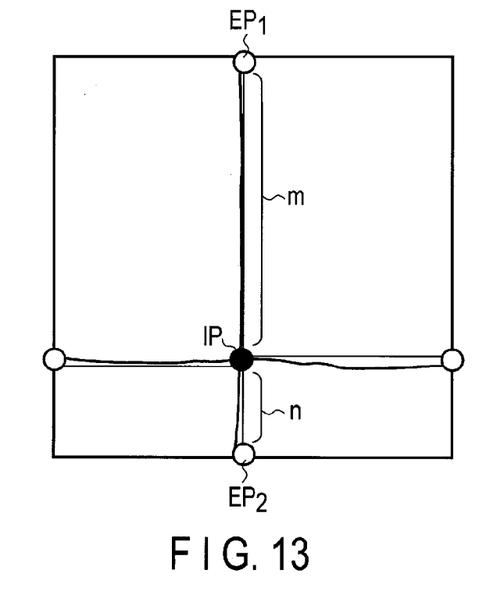
FIG. 13 is a view showing determination processing of small extension ruled lines based on a ratio of line segments.

In the embodiment C, based on a ratio of lengths of two line segments decided by an intersection point of two ruled lines in a small extension region, the determiner 7 determines that a shorter line segment is a small extension ruled line. For example, as shown in FIG. 13, based on a ratio between a length of a line segment m including an intersection point IP and end point $EP_1$ and that of a line segment n including the intersection point IP and an end point $EP_2$, the determiner 7 can determine that the line segment n is a small extension ruled line. Conversely, when a ratio between m and n is roughly 1:1, the determiner 7 determines that m and n are second ruled lines, and circumscribed ruled lines are connected to the end points $EP_1$ and $EP_2$.

Embodiment D

Figure 14:
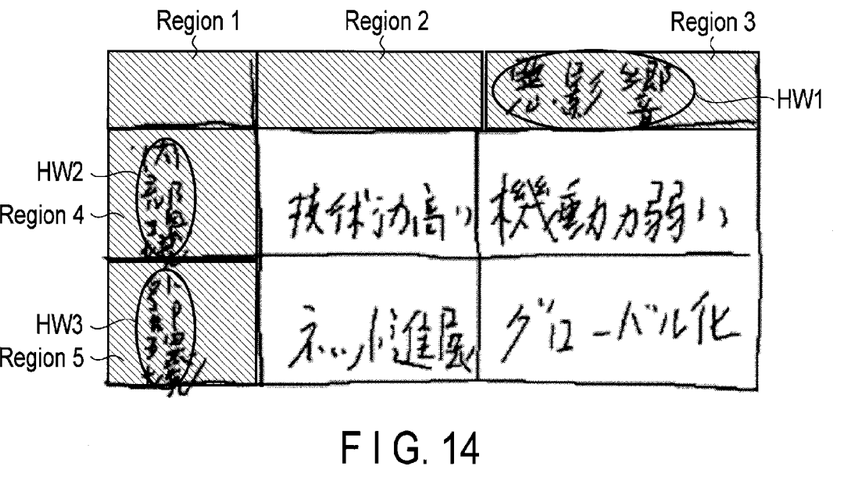
FIG. 14 is a view showing grouping of cell regions.

An embodiment D can be practiced in combination with the embodiment B. When the embodiment B is applied, a second ruled line (a ruled line connected to a circumscribed ruled line) is determined using a second reference value (a reference value of the number of strokes other than ruled lines). More specifically, as shown in FIG. 14, a region 3 including a stroke group HW1 other than ruled lines, a region 4 including a stroke group HW2 other than ruled lines, and a region 5 including a stroke group HW3 other than ruled lines are determined as regions including second ruled lines, that is, cell regions, some ruled lines of which are missing.

In this case, it is estimated that the user makes handwriting on regions which belong to an identical column and those which belong to an identical row with a common intention, and if some regions are cell regions, other regions which belong to a single column or row can be considered as blank cell regions. Therefore, it is preferable to apply the determination result as the cell regions to other regions.

In the embodiment D, regions connected to the same ruled line are grouped, and the determination result is spread across the group. More specifically, the determiner 7 groups a plurality of small extension regions sharing a ruled line, and applies the determination result of the second ruled line to the group. For example, in FIG. 14, the determiner 7 applies the determination result indicating that the ruled lines in the small extension region 3 are second ruled lines to other small extension regions 1 and 2 which share the ruled line in the identical row, and determines that ruled lines in the other small extension regions are second ruled lines.

Note that the aforementioned embodiments A to D may be solely practiced or a plurality of embodiments may be appropriately combined.

Next, the estimator 8 and display 9 will be described below.

Embodiment E

Figure 15:
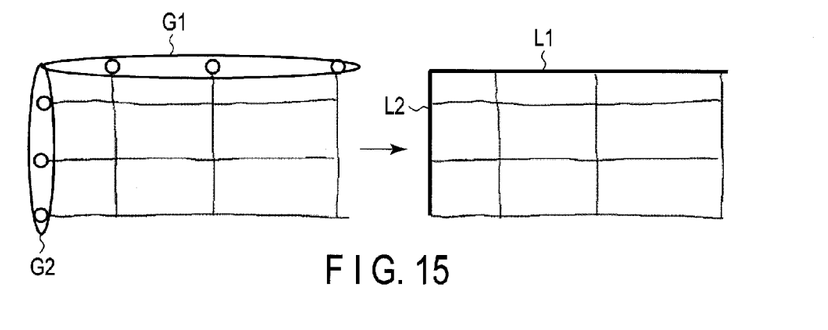
FIG. 15 is a view showing estimation of circumscribed ruled lines.

In an embodiment E, the estimator 8 includes a first estimator which estimates circumscribed ruled lines connected to second ruled lines determined by the determiner 7. The first estimator estimates circumscribed ruled lines L1 and L2 respectively for end point groups G1 and G2 of second ruled lines, as shown in FIG. 15. The circumscribed ruled lines L1 and L2 correspond to virtual circumscribed ruled lines which are not handwriting-input and are omitted. For example, a horizontal line which passes through average positions of Y coordinates of the end point group G1 is used as the circumscribed ruled line L1 in the horizontal (row) direction, and a vertical line which passes through average positions of X coordinates of the end point group G2 is used as the circumscribed ruled line L2 in the vertical (column) direction. As shown in FIG. 15, the estimated circumscribed ruled lines L1 and L2 are displayed by the display 9 together with handwritten contents.

Embodiment E'

Figure 16:
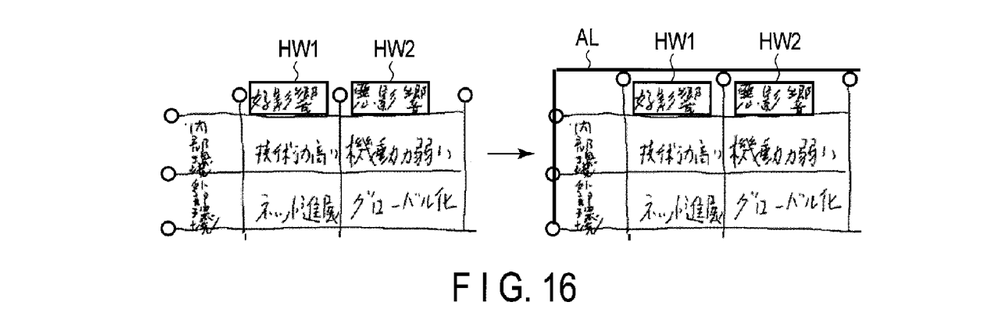
FIG. 16 is a view showing position correction of circumscribed ruled lines.

An embodiment E' relates to a modification of the embodiment E. Upon estimating circumscribed ruled lines, as shown in FIG. 16, it is preferable to correct a horizontal position of a circumscribed ruled line AL so as not to extend over stroke groups HW1 and HW2 other than ruled lines, that is, handwritten character strings in this example.

Simply, Y coordinates of the groups HW1 and HW2 are compared with that of the circumscribed ruled line AL, and the Y coordinate of the circumscribed ruled line AL is corrected to the same value or a value falling within a predetermined threshold range.

Embodiment F

Figure 17:
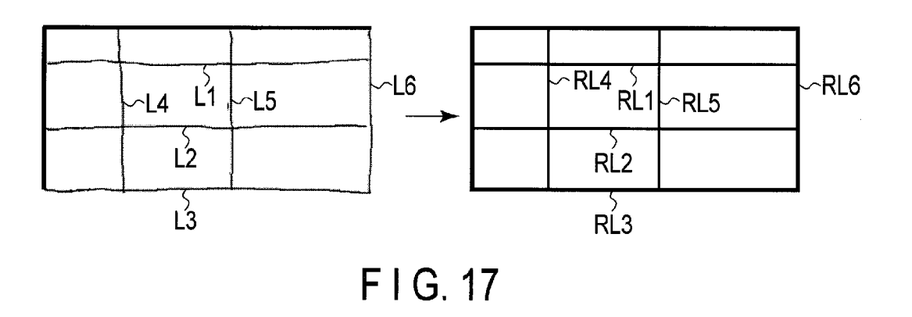
FIG. 17 is a view showing line conversion of handwritten ruled lines.

In an embodiment F, the estimator 8 includes a second estimator which estimates a straight-converted ruled line of a ruled line handwritten by the user. For example, as shown in FIG. 17, straight lines RL1 to RL6 which pass through barycenters of respective ruled lines are estimated in association with handwritten ruled lines L1 to L6. The display 9 displays the straight lines RL1 to RL6 in place of the handwritten ruled lines L1 to L6.

Embodiment G

Figure 18:
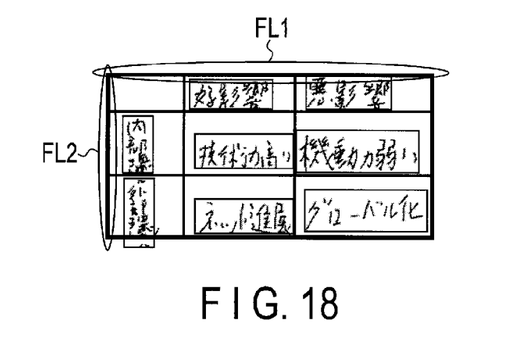
FIG. 18 is a view for explaining a display mode of circumscribed ruled lines.

In an embodiment G, the display 9 displays circumscribed ruled lines (virtual lines) estimated by the estimator 8 and ruled lines handwriting-input by the user in different display modes. More specifically, stroke attributes such as a display color, thickness, and line type are switched. For example, in FIG. 18, circumscribed ruled lines FL1 and FL2 are estimated and complemented by the estimator 8, and other ruled lines are those which are handwriting-input by the user. Different display modes are used so as to distinguish these lines from each other.

Note that it is preferable to switch between a display mode of distinguishably displaying the estimated circumscribed ruled lines and that without any such distinction.

Note that the aforementioned embodiments E to G may be solely practiced, but a plurality of embodiments may be appropriately combined.

Figure 19A:
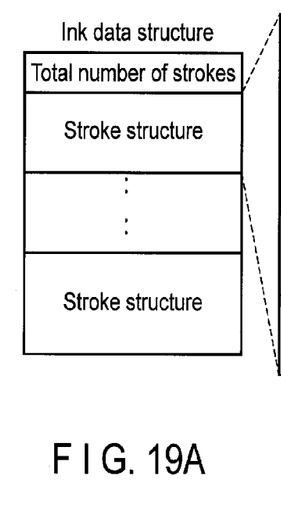
FIGS. 19A, 19B, and 19C are views showing a data structure example of stroke data.

An example of the more detailed data structure of the stroke data 1 (handwriting data) will be described below with reference to FIGS. 19A, 19B, and 19C.

"Stroke" is a handwriting-input pen image, and expresses a locus from when a pen or the like is brought into contact with an input surface until it is released. Normally, since points on the locus are sampled at predetermined timings (for example, at constant cycles), the stroke is expressed as a sequence of the sampled points.

Figure 19B:
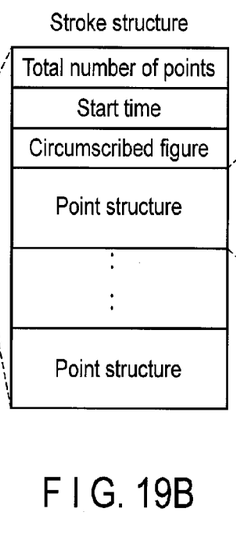

In the example shown in FIG. 19B, a stroke structure for one stroke is expressed by a set of coordinate values on a moving plane of the pen (point structures). More specifically, the stroke structure includes the "total number of points" indicating the number of points which form that stroke, a "start time", "circumscribed figure", and a sequence of "point structures" as many as the total number of points. Note that the start time indicates a time at which the pen is brought into contact with the input surface and begins to write in that stroke. The circumscribed figure indicates that (preferably, a rectangle having a minimum area which includes that stroke on a document plane) for the locus of that stroke.

The structure of a point depends on an input device. In the example of FIG. 19C, the structure of one point has four values, that is, coordinate values x and y at which that point is sampled, a writing pressure, and a time difference from an initial point (for example, the above "start time").

Note that coordinates are those on a coordinate system of a document plane, and may be expressed by positive values which increase toward a lower right corner to have an upper left corner as an origin.

Figure 19C:
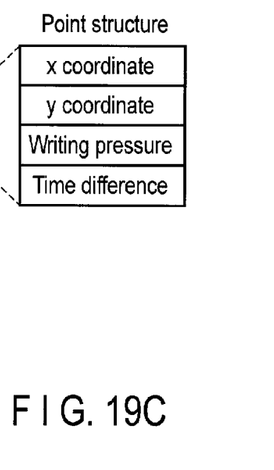

When the input device cannot acquire a writing pressure or when it can acquire a writing pressure but the subsequent processing does not use the writing pressure, the writing pressure in FIG. 19C may be omitted, or data which indicates invalidity may be described in the writing pressure.

Note that in the example shown in FIGS. 19B and 19C, real data such as coordinate values x and y may be described in areas of individual point structures in the stroke structure, or data of the stroke structure and those of point structures may be independently managed, and link information to a corresponding point structure may be described in an area of each individual point structure in the stroke structure.

The handwritten document processing apparatus of this embodiment may be configured as a standalone apparatus or as a plurality of nodes which can communicate with each other via a network and to which functions of the apparatus are distributed.

The handwritten document processing apparatus of this embodiment can be implemented by various devices such as a desktop or laptop type general-purpose computer, portable general-purpose computer, another portable information device, information device having a touch panel, smartphone, another information processing apparatus, and the like.

Figure 20:
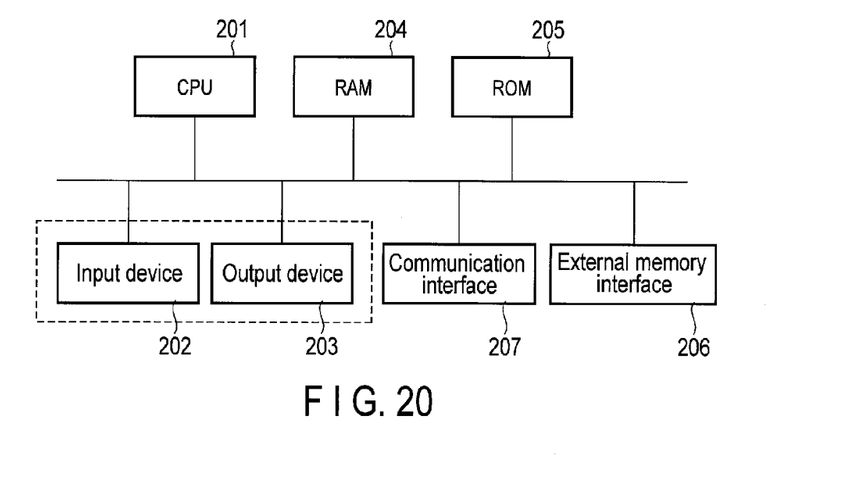
FIG. 20 is a block diagram showing a hardware arrangement example.

FIG. 20 shows a hardware arrangement example which implements the handwritten document processing apparatus of this embodiment. Referring to FIG. 20, reference numeral 201 denotes a CPU; 202, a predetermined input device; 203, a predetermined output device; 204, a RAM; 205, a ROM; 206, an external memory interface; and 207, a communication interface. For example, when a touch panel is used, for example, a liquid crystal panel, a pen, a stroke detection device arranged on the liquid crystal panel, and the like are used (see 208 in FIG. 20).

Also, for example, some components shown in FIG. 1 may be arranged on a client, and remaining components in FIG. 1 may be arranged on a server.

Figure 21:
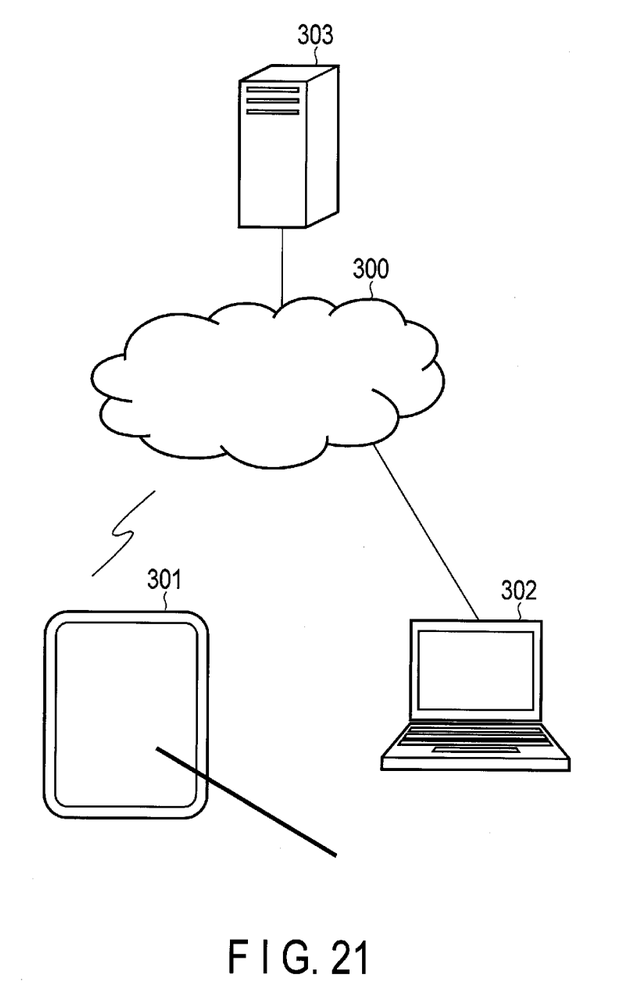
FIG. 21 is a view showing a network configuration example.

For example, FIG. 21 shows an implementation example of the handwritten document processing apparatus of this embodiment by allocating a server 303 on a network 300 such as an intranet and/or the Internet, and allowing clients 301 and 302 to communicate with the server 303 via the network 300.

Note that in the example shown in FIG. 21, the client 301 is connected to the network 300 via wireless communications, and the client 302 is connected to the network 300 via wired communications.

The clients 301 and 302 are normally user apparatuses. The server 303 may be, for example, that arranged on a LAN such an intra-firm LAN, or may be managed by an Internet service provider or the like. The server 303 may be a user apparatus, and a certain user may provide functions to another user.

As a method of distributing the components shown in FIG. 1 to the clients and server, various methods may be used.

Instructions shown in the processing sequence described in the aforementioned embodiment can be executed based on a program as software. A general-purpose computer system may store this program in advance, and loads this program, thus obtaining the same effects as those of the handwritten document processing apparatus of the aforementioned embodiment. The instructions described in the above embodiment are recorded as a program which can be executed by a computer in a magnetic disk (flexible disk, hard disk, and the like), optical disk (CD-ROM, CD-R, CD-RW, DVD-ROM, DVD±R, DVD±RW, and the like), semiconductor memory, or recording media like them. A storage format of a recording medium which can be read by a computer or embedded system is not particularly limited. The computer loads a program from the recording medium, and controls a CPU to execute instructions described in the program based on this program, thus implementing the same operations as those of the handwritten document processing apparatus of the aforementioned embodiment. Of course, the computer may acquire or load the program via a network.

An OS (Operating System) or MW (middleware) such as database management software or network, which runs on the computer, may execute some of the processes required to implement this embodiment based on instructions of the program installed from the recording medium in the computer or embedded system.

Furthermore, the recording medium of this embodiment is not limited to a medium independent of the computer, but it includes a recording medium which stores or temporarily stores a program downloaded via a LAN or the Internet.

The number of recording media is not limited to one, and the recording medium of this embodiment includes a case in which the processing of this embodiment is executed from a plurality of media. That is, the configuration of media is not particularly limited.

Note that the computer or embedded system in this embodiment is required to execute respective processes in this embodiment based on the program stored in the recording medium, and may be either a single apparatus such as a personal computer or microcomputer or a system in which a plurality of apparatuses are connected via a network.

The computer of this embodiment is not limited to a personal computer but it includes an arithmetic processing device, microcomputer, or the like included in an information processing apparatus, and collectively means a device or apparatus which can implement the functions of this embodiment by means of a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handwritten document processing apparatus comprising:
   an inputter that inputs stroke data;
   a classifier that classifies the stroke data into data of a plurality of ruled lines and stroke data other than ruled lines;
   a divider that divides a region including the plurality of ruled lines into first regions each corresponding to a cell bounded by four ruled lines and second regions each including at most three ruled lines; and
   a determiner that determines whether a ruled line in the second region is a first ruled line, to one end point of which a ruled line is not connected, or a second ruled line, to one end point of which a virtual circumscribed ruled line is connected.

2. The apparatus of claim 1, further comprising a first estimator that estimates the virtual circumscribed ruled line.

3. The apparatus of claim 1, further comprising a second estimator that estimates straight-converted ruled lines of the plurality of ruled lines.

4. The apparatus of claim 2, further comprising a display that displays the circumscribed ruled lines in a display mode different from that of the plurality of ruled lines of the stroke data.

5. The apparatus of claim 1, wherein the determiner determines a ruled line which falls below a first reference value based on a statistical amount calculated from stroke lengths of ruled lines that defines the cell as the first ruled line.

6. The apparatus of claim 1, wherein when one of the number of strokes and a total length of strokes other then the ruled lines in the second region is not less than a second reference value, the determiner determines that the ruled lines in the second region are the second ruled lines.

7. The apparatus of claim 1, wherein based on a ratio of lengths of two line segments decided by an intersection point of two ruled lines in the second region, the determiner determines that a shorter line segment is the first ruled line.

8. The apparatus of claim 6, wherein the determiner applies a determination result of the second ruled line using the second reference value to another second region which shares a ruled line, and determines that ruled lines in the other second region are the second ruled lines.

9. A handwritten document processing method comprising:
   inputting stroke data;
   classifying the stroke data into data of a plurality of ruled lines and stroke data other than ruled lines;
   dividing a region including the plurality of ruled lines into first regions each corresponding to a cell bounded by four ruled lines and second regions each including at most three ruled lines; and
   determining whether a ruled line in the second region is a first ruled line, to one end point of which a ruled line is not connected, or a second ruled line, to one end point of which a virtual circumscribed ruled line is connected.

10. A non-transitory recording medium that stores a program for controlling a computer to function as:
    an inputter that inputs stroke data;
    a classifier that classifies the stroke data into data of a plurality of ruled lines and stroke data other than ruled lines;
    a divider that divides a region including the plurality of ruled lines into first regions each corresponding to a cell bounded by four ruled lines and second regions each including at most three ruled lines; and
    a determiner that determines whether a ruled line in the second region is a first ruled line, to one end point of which a ruled line is not connected, or a second ruled line, to one end point of which a virtual circumscribed ruled line is connected.

11. A handwritten document processing apparatus comprising:
    a processor configured to input stroke data, to classify the stroke data into data of a plurality of ruled lines and stroke data other than ruled lines, to divide a region including the plurality of ruled lines into first regions each corresponding to a cell bounded by four ruled lines and second regions each including at most three ruled lines, and to determine whether a ruled line in the second region is a first ruled line, to one end point of which a ruled line is not connected, or a second ruled line, to one end point of which a virtual circumscribed ruled line is connected; and
    a memory connected to the processor.

12. A handwritten document processing apparatus comprising:
- an inputter that inputs stroke data;
- a classifier that classifies the stroke data into data of a plurality of ruled lines and stroke data other than ruled lines;
- a divider that divides a region including the plurality of ruled lines into first regions each corresponding to a cell bounded by four ruled lines and second regions each including at most three ruled lines; and
- a controller that controls a display to remove a small extension included in the second regions so that the small extension is not displayed.

13. A handwritten document processing apparatus comprising:
- an inputter that inputs stroke data;
- a classifier that classifies the stroke data into data of a plurality of ruled lines and stroke data other than ruled lines;
- a divider that divides a region including the plurality of ruled lines into first regions each corresponding to a cell bounded by four ruled lines and second regions each including at most three ruled lines based on a number of intersections or a number of ruled lines;
- and a display that displays a virtual circumscribed ruled line for the second regions.

* * * * *